(12) United States Patent
Kaplan

(10) Patent No.: US 6,725,462 B1
(45) Date of Patent: Apr. 20, 2004

(54) OPTIMIZING UPSTREAM TRANSMISSION IN A CABLE TELEVISION DISTRIBUTION PLANT

(75) Inventor: Alan Edward Kaplan, Morris Township, Morris County, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/552,628

(22) Filed: Apr. 19, 2000

(51) Int. Cl.[7] .............................. H04N 7/173; H04J 1/00
(52) U.S. Cl. ..................... 725/124; 725/121; 725/125; 725/127; 725/128; 725/95; 370/480
(58) Field of Search ................................ 725/124, 125, 725/127, 128, 111; 370/480, 485, 488

(56) References Cited

U.S. PATENT DOCUMENTS

| | | | | |
|---|---|---|---|---|
| 5,805,203 A | * | 9/1998 | Horton ......................... | 725/119 |
| 5,862,451 A | * | 1/1999 | Grau et al. ................... | 725/116 |
| 5,870,395 A | * | 2/1999 | Baran ........................ | 370/395.1 |
| 5,870,429 A | * | 2/1999 | Moran et al. ................ | 375/222 |

* cited by examiner

Primary Examiner—Vivek Srivastava
Assistant Examiner—Johnny Ma

(57) ABSTRACT

A method and apparatus for reducing delay distortion of upstream transmissions in a cable television (CATV) distribution plant. Upstream transmission in a CATV distribution plant, i.e., from the customer premises toward the head-end, is made difficult by delay distortion caused by diplexing filters used in bi-directional amplifiers and other components in the CATV distribution plant. A database storing information relating to each cable modem (CM) in the CATV distribution plant is maintained, and the delay distortion for each upstream transmission is calculated using information queried from the database. Delay distortion in the upper portion of the upstream bandwidth in a CATV distribution plant is preferably minimized by assigning CMs having a transmission path that causes relatively minimal delay distortion to the upper portion of the upstream bandwidth. Alternatively, the upper portion of the upstream bandwidth is preferably assigned to the largest number of CMs that have the same number of bi-directional amplifiers in their respective transmission paths. For either frequency assigning technique, a fixed equalizer may be used to further minimize delay distortion. Alternatively, delay distortion for upstream transmissions transmitted on any frequency in the upstream bandwidth may be minimized using a variable equalizer. The delay distortion for an upstream path is calculated using information queried from the database. The tap weights for the variable equalizer are adjusted depending on the calculated distortion for each upstream transmission.

30 Claims, 5 Drawing Sheets

FIG. 2

| CABLE MODEM ID | CABLE MODEM TYPE | BI-DIRECTIONAL AMP TYPE | NUMBER OF BI-DIRECTIONAL AMPS OF THAT TYPE | FIBER NODE TYPE | DIPLEXING FILTER TYPE | NUMBER OF DIPLEXING FILTERS OF THAT TYPE |
|---|---|---|---|---|---|---|
| 123 | CISCO 924 | SA XXX | 1 | GR | ZZZ | 4 |
| ... | ... | ... | ... | ... | ... | ... |
| 321 | CISCO 928 | SA YYY | 5 | GR | ZZZ | 12 |
| ... | ... | ... | ... | ... | ... | ... |

OPTIMIZING UPSTREAM TRANSMISSION IN A CABLE TELEVISION DISTRIBUTION PLANT

FIELD OF THE INVENTION

The present invention relates to upstream transmission in a cable television distribution plant. More particularly, the present invention relates to a method for reducing delay distortion and for allocating frequencies for upstream transmission in a cable television distribution plant.

BACKGROUND OF THE INVENTION

Conventionally, a CATV distribution plant includes cable modems (CMs), some of which are located at customers' premises. CMs transmit and receive packets from a cable modem termination system (CMTS) that is located at a head-end. The CMTS transmits signals to CMs in the downstream bandwidth, which is approximately 52–750 MHz. An upstream transmission in a CATV distribution plant, i.e., from a customer's premises toward the CMTS, is made difficult by delay distortion caused by diplexing filters that are needed at each bi-directional amplifier, CM and fiber node. Generally, two diplexing filters are used for each bi-directional amplifier and one diplexing filter is used for each CM and fiber node.

One approach for dealing with delay distortion is to train a preemphasis filter in a transmitter at each CM to compensate for delay distortion produced by diplexing filters in each transmission path. This approach may work well, but providing an adjustable preemphasis filter at each transmitter is expensive and the training slows the already too slow process of starting up a cable modem. Hence, a need exists for providing a simpler and less expensive solution for reducing delay distortion in upstream transmissions, thereby improving signal quality.

Generally, group delay, wherein some frequencies exhibit greater time delay than others, distorts an upstream transmission. FIG. 6 illustrates group delay caused by a bi-directional amplifier having two diplexing filters for an upstream bandwidth of approximately 5–42 MHz. The differential group delay curve illustrates the dramatic change in group delay for frequency ranges A and B, near the ends of the upstream bandwidth. For example, frequency range B, which is near the split between the upstream and downstream bandwidths, has a dramatic change in group delay. Upstream transmissions in frequency ranges A and B will have relatively large delay distortion that results in signal degradation and, possibly, data loss. The upstream bandwidth may include a frequency range other than approximately 5–42 MHz, e.g. approximately 750 MHz–1 GHz. Delay distortion, however, generally increases dramatically near the split between the upstream and downstream bandwidths, and thus presents a problem for an upstream transmission on a frequency near the split. Thus, a need exists for reducing delay distortion of upstream transmissions on frequencies near a split between the upstream and downstream bandwidths, so the upstream bandwidth can be maximally utilized.

Furthermore, for an upstream bandwidth of approximately 5–42 MHz, the lower end of the upstream bandwidth, which also suffers from increased delay distortion, is noisy. Thus, if delay distortion is reduced at the lower end of the bandwidth, noise is still a problem. On the other hand, the upper portion of the upstream bandwidth, e.g., approximately 38–42 MHz, is relatively quiet, but suffers from relatively large delay distortion. Consequently, a need exists for reducing delay distortion in the upper portion of the upstream bandwidth, near the split between the upstream and downstream bandwidths, in order to take advantage of the relatively quiet upper portion of an upstream bandwidth having a range of approximately 5–42 MHz.

Accordingly, it is an aspect of the present invention to provide simple and less expensive solutions for reducing delay distortion for upstream frequencies near the split between the upstream and downstream bandwidths.

SUMMARY OF THE INVENTION

In accordance with an aspect of the present invention a database is provided for storing the CM identification (ID), the CM type, the bi-directional amplifier type, the number of bi-directional amplifiers of each type and the fiber node type for each transmission path. Delay distortion for a transmission path can be calculated using the information stored in the database corresponding to the CM associated with the transmission path.

Also, in accordance with another aspect of the present invention, the upper portion of an upstream bandwidth may be assigned to a CM having a transmission path that causes relatively minimal delay distortion. Calculated delay distortion for a CM is compared to a predetermined threshold, and the CM is preferably assigned to the upper portion of the upstream bandwidth if the calculated delay distortion is less than the predetermined threshold. Furthermore, a fixed equalizer may be used for minimizing delay distortion for upstream transmissions.

Also, in accordance with another aspect of the present invention, the upper portion of an upstream bandwidth may be assigned to the largest number of CMs that have the same number of bi-directional amplifiers in their respective transmission paths. Calculated delay distortion for a CM is compared to a predetermined threshold, and the CM is preferably assigned to the upper portion of the upstream bandwidth if the calculated delay distortion is equal to the predetermined threshold. Furthermore, a fixed equalizer may be used for minimizing delay distortion for upstream transmissions.

Also, in accordance with another aspect of the present invention, a variable equalizer at the fiber node may be provided for minimizing delay distortion of an upstream transmission. Delay distortion for the transmission path is calculated using information from the database corresponding to the CM associated with the transmission path. The variable equalizer is set to minimize the calculated delay distortion.

BRIEF DESCRIPTION OF THE DRAWINGS

The present invention is illustrated by way of example and not limitation in the accompanying figures in which like reference numerals indicate similar elements and in which:

FIG. 2 shows an exemplary embodiment of a database structure;

DETAILED DESCRIPTION OF THE INVENTION

Figure 1:
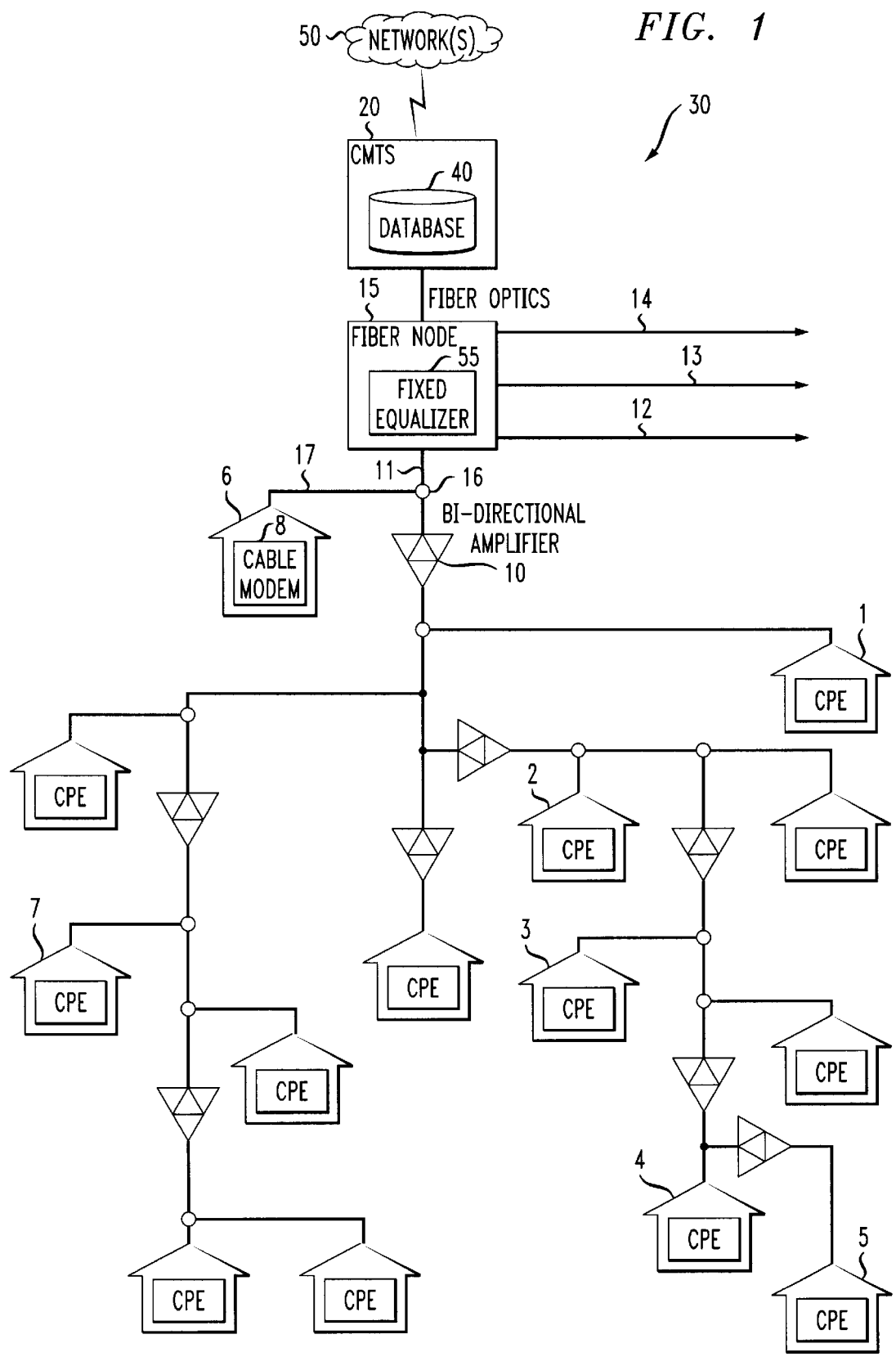
FIG. 1 is a schematic block diagram depicting an exemplary embodiment of a CATV distribution plant.

FIG. 1 is a schematic block diagram of an exemplary embodiment of a CATV distribution plant 30 for providing a communications medium between CMTS 20 and multiple customer premises. Plant 30 is a hybrid-fiber coaxial (HFC) distribution plant including fiber optics for connecting CMTS 20, which may be located at a head-end, and fiber node 15. Plant 30 also includes coaxial cables 11–14 for connecting fiber node 15 to multiple customer premises, such as customer premises 1–7, in, for example, a tree structure. Also, each customer premises is connected to coaxial cables 11–14 via a tap and drop line For example, coaxial cable 11 is connected to customer premises 6 via tap 16 and a drop line 17. Furthermore, each customer premises includes a cable modem (CM) 8 for transmitting and receiving digital signals and customer provided equipment (CPE), not shown, that can interfaces with CM 8. Although not shown, each of coaxial cables 12–14 is also connected to multiple customer premises in, for example, a tree structure. The total number of customer premises serviced by a single fiber node may, for example, be between 50 and 2000 customer premises. In addition, although only a single fiber node 15 is shown, multiple fiber nodes may be connected to CMTS 20, and each fiber node can be connected to multiple customer premises similarly to fiber node 15. Also, fiber node 15 is connected to four coaxial cables 11–14, but the number of coaxial cables connected to each fiber node may be increased or decreased depending on customer demand, available bandwidth, QoS and other capacity engineering issues that are beyond the scope of this invention.

CMTS 20 may be connected to one or more networks 50. Network(s) 50 may comprise any known network type including circuit-switched networks, e.g., a PSTN, or packet-switched networks. Additionally, CMTS 20 is responsive to CMs 8 located in each customer premise. CMTS 20 may control transmissions between CMs 8 and the network(s) 50. Also, CMTS 20 may assign upstream frequencies to each CM 8, when a CM 8 is first connected to the distribution plant 30. A CM 8 may comprise an internal or external unit connected to CPE, and a customer may lease or buy CM 8. CPE, for example, may include a personal computer (PC) or any communication device adaptable for connecting to distribution plant 30 via a CM 8.

Bi-directional amplifiers 10, located in transmission paths between each CM 8 and fiber node 15, provide gain for upstream and downstream transmissions. For example, the transmission path between customer premises 1 and fiber node 15 includes one bi-directional amplifier 10. In contrast, the transmission path between customer premises 5 and fiber node 15 includes five bi-directional amplifiers 10. Each bi-directional amplifier 10 includes two diplexing filters, and fiber node 15 and CMs 8 each include one diplexing filter. Diplexing filters are a substantial cause of delay distortion in the distribution plant 30. Thus, as the number of bi-directional amplifiers in a transmission path increases, the delay distortion of the transmission following the corresponding path increases. Delay distortion of an upstream transmission increases near the ends of the upstream bandwidth. The upstream bandwidth is approximately 5–42 MHz and the lower end of the upstream bandwidth is relatively noisy. However, the upper end of the upstream bandwidth, e.g., approximately 38–42 MHz, is relatively quiet. Thus, if delay distortion can be minimized in the upper portion of the upstream bandwidth, the upper portion of the bandwidth can provide a relatively quiet upstream transmission medium having relatively low delay distortion.

FIG. 2 shows a typical database 40 in accordance with the present invention. In a first preferred embodiment of the present invention, CMs 8 having a limited number of bi-directional amplifiers 10 in their respective transmission paths and consequently having transmission paths that cause relatively minimal delay distortion are preferably assigned to the upper portion of the upstream bandwidth. Database 40 stores requisite information pertaining to each CM 8. FIG. 1 shows database 40 located at CMTS 20, but the database 40 can be located remotely from CMTS 20, such as in network 50. FIG. 2 illustrates an exemplary structure of a database 40. The database 40 includes fields for CM identification (ID), CM type, bi-directional amplifier type, number of bi-directional amplifiers of that type, diplexing filter type, number of diplexing filters of that type and fiber node type. Normally only one brand of bi-directional amplifier and fiber node are used, but database 40 can accommodate distribution plants having multiple brands and types of bi-directional amplifiers and fiber nodes. For the examples described below, all bi-directional amplifiers 10 are of the same brand. Each CM 8 has an ID provided by the manufacturer. The ID of CM 8 located at customer premises 1, for example, is 123. The CM type may be, for example, a Cisco 924, and the bi-directional amplifier type may be, for example, an SA XXX. The number of bi-directional amplifiers of that type is 1, because there is only one bi-directional amplifier 10 in the transmission path between CM 8 at customer premises 1 and fiber node. 15.

Another example is shown for CM 8 located at customer premises 5. CM 8 may be given an ID of, for example, 321. CM type may be, for example, a Cisco 928. The bi-directional amplifier type may be, for example, an SA YYY, and the number of bi-directional amplifiers is five. The fiber node type is the same, because CMs 8 connected to coaxial cable 11 are all connected to the same fiber node 15.

Some of the brands and types shown in FIG. 2, such as ZZZ for diplexing filter type, are fictitious and are provided to illustrate the present invention. The actual brands and types used in a CATV distribution plant may be readily determined and entered in database 40.

The delay distortion of an upstream transmission from a CM 8 is generally based on the number and type of diplexing filters in a transmission path. The data for each CM 8 stored in the database 40 may be used for determining delay distortion of an upstream transmission from any CM 8. Delay distortion values for the type of CM, the type of bi-directional amplifier, the type of fiber node and possibly the type of diplexing filter used in a transmission path from a CM 8 may be provided by the manufacturer or otherwise determined, e.g., the delay distortion for a specific type of CM, fiber node, bi-directional amplifier or diplexing filter can be measured. If the diplexing filter types can be determined for diplexing filters in fiber node 15, bi-directional amplifiers 10 and/or CM 8 in a transmission path, then the delay distortion for the diplexing filter types may be stored in database 40. Delay distortion values stored in database 40 are a function of frequency. Accordingly, for example, either a function for calculating the delay distortion at a particular frequency or delay distortion for each frequency may be stored in database 40 for each CM type, bi-directional amplifier type, fiber node type and diplexing filter type. The delay distortion for an upstream transmission may be determined by summing the delay distortion caused by diplexing filters in the CM 8, the fiber node 15 and each bi-directional amplifier 10 in the upstream path. CM 8 is preferably assigned to a frequency in the upper portion of the upstream bandwidth, if the delay distortion of an upstream transmission from CM 8 is less than a predetermined threshold. However, other factors known to one of ordinary skill in the art, such as noise, available capacity and other factors affecting signal quality, may prevent CMTS 20 from assigning a frequency in the upper portion of the upstream bandwidth. For example, if the upper portion of the upstream bandwidth is already assigned to a predetermined maximum number of subscribers, then CM 8 will be assigned to a frequency outside the upper portion of the upstream bandwidth. Also, if the upper portion of the upstream bandwidth is experiencing an abnormal amount of noise that, for example, may result in data loss, then CMTS 20 may not assign a frequency in the upper portion of the upstream bandwidth.

Delay distortion for a transmission path having one or having no bi-directional amplifiers 10 generally falls below the predetermined threshold, and thus, an upstream transmission from a CM 8 located at any one of customer premises 1, 6 and 7 is preferentially assigned to the upper portion of the upstream bandwidth. The predetermined threshold for each distribution plant, however, may vary. Furthermore, a simple additional optimization is to add a fixed equalizer 55 at fiber node 15 for minimizing delay distortion.

Fixed equalizer 55 may, for example, be configured to minimize delay distortion for a transmission path having a delay distortion falling below the predetermined threshold, e.g., a transmission path having one or no bi-directional amplifiers 10. Alternatively, fixed equalizer 55 may be configured to minimize delay distortion for a transmission path that benefits the largest number of subscribers. For example, in FIG. 1, five subscribers are two bi-directional amplifiers 10 away from fiber node 15; four subscribers are three bi-directional amplifiers 10 away from fiber node 15; two subscribers are one bi-directional amplifiers 10 away from fiber node 15; one subscriber is four bi-directional amplifiers 10 away from fiber node 15; one subscriber is five bi-directional amplifiers 10 away from fiber node 15; and one subscriber has no bi-directional amplifiers 10 in its transmission path. Therefore, the largest number of subscribers having the same number of bi-directional amplifiers in their respective transmission paths is five, i.e., subscribers having two bi-directional amplifiers 10 in their respective transmission paths. Therefore, in this example, fixed equalizer 55 is configured to minimize delay distortion for a transmission path having two bi-directional amplifiers 10, because this configuration benefits the largest number of subscribers. The largest number of subscribers having the same number of bi-directional amplifiers 10 in their respective transmission paths may be determined using database 40.

Figure 3:
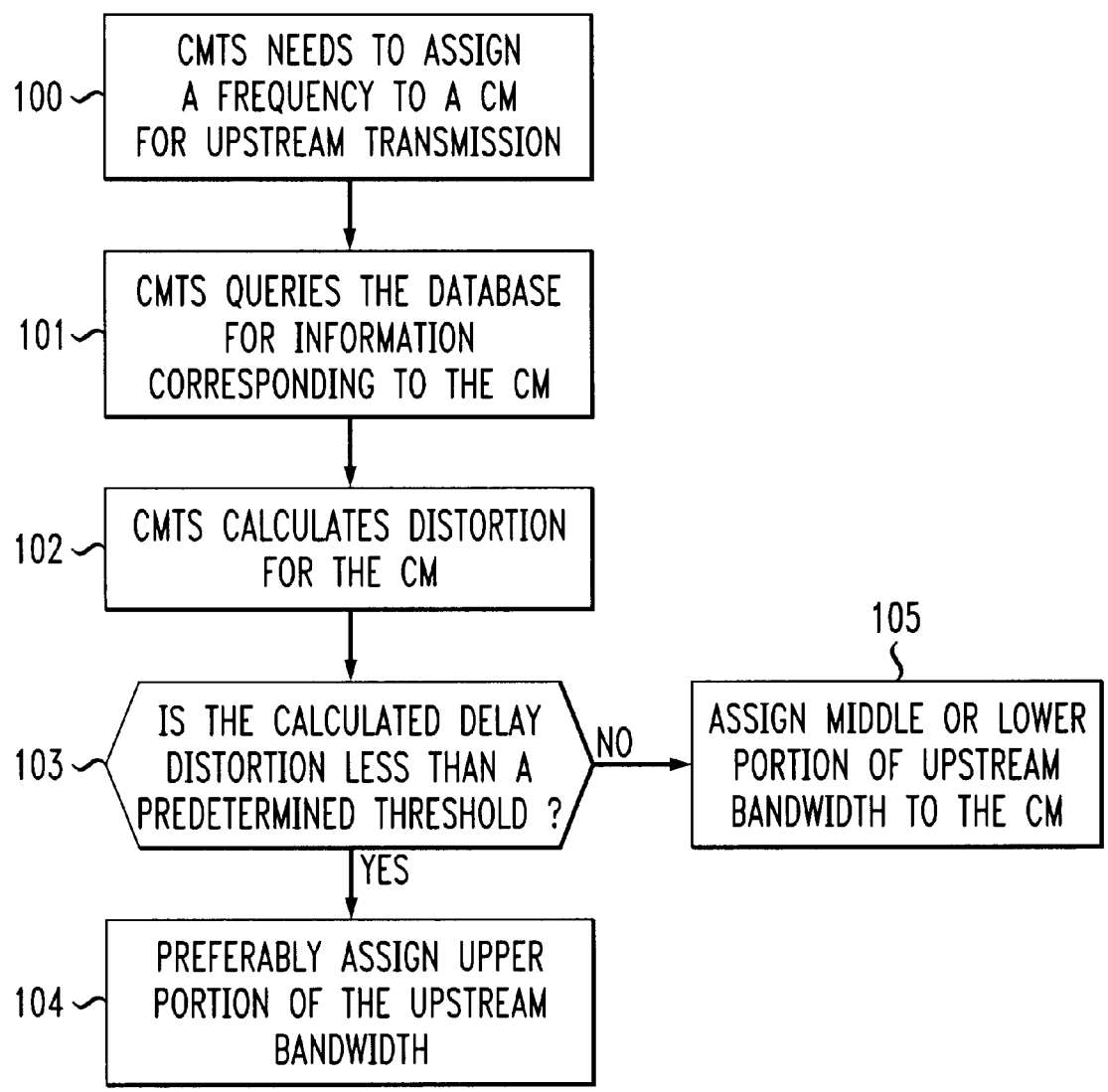
FIG. 3 is a flow diagram of a first preferred embodiment for reducing delay distortion.

FIG. 3 is a flow diagram of the fist preferred embodiment present invention. In step 100, CMTS 20 needs to assign a frequency for an upstream transmission from a CM 8. CMTS 20 may assign a frequency to CM 8 for an upstream transmission when CM 8 is first connected, when CM 8 requests additional bandwidth for an upstream transmission, or when an assigned frequency is noisy. In step 101, with the identified CM ID of CM 8, CMTS 20 queries database 40 for the bi-directional amplifier type, number of bi-directional amplifiers of that type, CM type and fiber node type. If there is more than one bi-directional amplifier type in the transmission path from CM 8, then the multiple bi-directional amplifier types and the number of bi-directional amplifiers for each type are also retrieved. In step 102, CMTS 20 determines the delay distortion of an upstream transmission from CM 8. In step 103, CMTS 20 determines whether the determined delay distortion is less than a predetermined threshold. As discussed above, generally distortion of an upstream transmission from a CM 8 having one or having no bi-directional amplifiers 10 in its transmission path will fall below the threshold. For example, an upstream transmission from CM 8 located at customer premises 1, 6 and 7 has one or no bi-directional amplifiers 10 in each of their respective transmission paths. Thus, the delay distortion of an upstream transmission from any one of customer premises 1, 6 and 7 may fall below the predetermined threshold. Hence, at step 104, CMTS 20 assigns frequencies in the upper portion of the upstream bandwidth, e.g., approximately 38–42 MHz, to CMs 8 located, for example, at customer premises 1, 6 and 7, unless other factors, e.g., factors relating to signal quality or available capacity, prevent CMTS 20 from assigning a frequency in the upper portion of the upstream bandwidth. Customer premises 2–5, have two or more bi-directional amplifiers 10 in their respective transmission paths to fiber node 15. Thus, at step 105 CMTS 20 preferably assigns frequencies in the middle or lower portion of the upstream bandwidth (e.g., frequencies greater than or equal to 5 MHz and less than 38 MHz) to CMs 8 located at, for example, customer premises 2–5, because the delay distortion for each transmission path may be above the predetermined threshold. Note, however, that frequencies below 10 MHz are rarely assigned, because of noise and possibly delay distortion experienced at those frequencies. A frequency in the upper portion of the upstream bandwidth, however, may be assigned to a CM 8 located, for example, at any one of customer premises 2–5 depending on other factors, e.g., factors relating to signal quality or available capacity. Generally, for this preferred embodiment, the upper portion of the upstream bandwidth is reserved for subscribers having a transmission path with a delay distortion threshold less than or equal to a predetermined threshold.

Also, in the first preferred embodiment of the present invention, for an upstream bandwidth having a range other than approximately 5–42 MHz, a CM 8, with an upstream transmission having a delay distortion less than the predetermined threshold, may be assigned to frequencies near the split between the upstream and downstream bandwidths.

In a second preferred embodiment of the present invention, frequencies in the upper portion of the upstream bandwidth are preferably assigned to CMs 8 generally having a relatively larger number of bi-directional amplifiers 10 in their respective transmission paths. Also, in this preferred embodiment, a fixed equalizer 55 may be configured to minimize delay distortion for a transmission path that benefits the largest number of subscribers.

Figure 4:
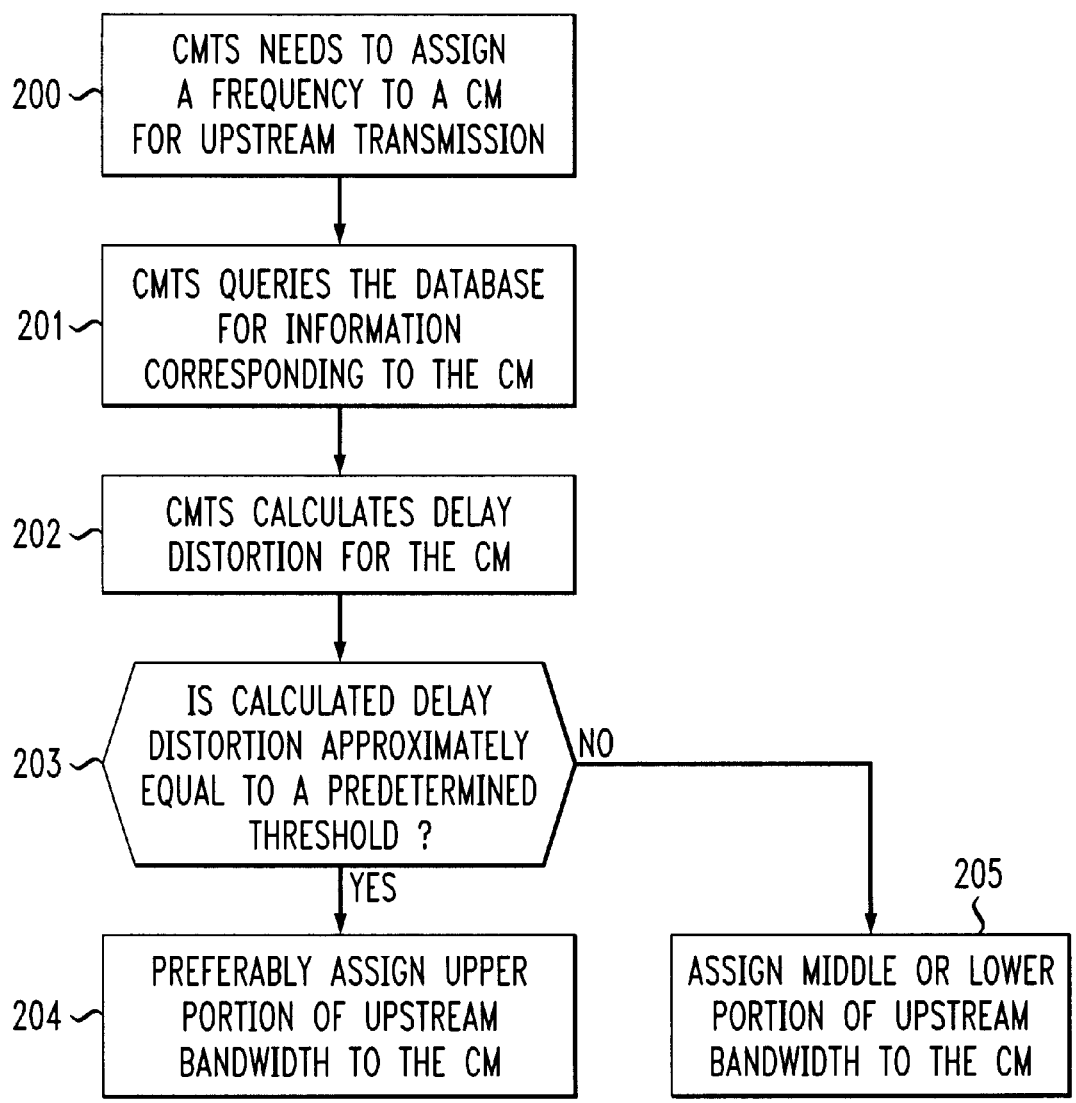
FIG. 4 is a flow diagram of a second preferred embodiment for reducing delay distortion.

FIG. 4 is a flow diagram of the second preferred embodiment of the present invention. In step 200, CMTS 20 needs to assign a frequency to CM 8 for an upstream transmission. In step 201, with the identified CM ID of CM 8, CMTS 20 queries database 40 for the bi-directional amplifier type, number of bi-directional amplifiers of that type, CM type and fiber node type. If there is more than one bi-directional amplifier type in the transmission path from CM 8, then the multiple bi-directional amplifier types and number of bi-directional amplifiers for each type are also retrieved. In step 202, CMTS 20 determines the delay distortion for CM 8, as described in the first preferred embodiment, using the information queried from database 40 in step 201. In step 203, CMTS 20 determines whether the delay distortion is approximately equal to a predetermined threshold. If the delay distortion is approximately equal to the predetermined threshold, then at step 204 CM 8 is preferably assigned the upper portion of the upstream bandwidth. Otherwise, at step 205 CM 8 is assigned to a frequency not in the upper portion of the upstream a bandwidth.

Generally, the predetermined threshold may be set, so delay distortion that affects the largest number of subscribers is equal to the predetermined threshold. For example, as described in the first preferred embodiment, the largest number of subscribers having the same number of bi-directional amplifiers in their respective transmission paths is five. Five subscribers have two bi-directional amplifiers 10 in each of their respective transmission paths. Thus, the predetermined threshold is set, for example, at a value approximately equal to a delay distortion for a transmission path from one of the five subscribers having two bi-directional amplifiers in its transmission path. The delay distortion for each transmission path may, however, vary depending on the type of diplexing filters used in CM 8 and bi-directional amplifiers 10 in each transmission path. Thus, the predetermined threshold may, for example, be a range of delay distortion values, and a CM 8 having a transmission path with a delay distortion falling within the range is preferably assigned to the upper portion of the upstream bandwidth.

Also, in the second preferred embodiment, fixed equalizer 55 is configured to minimize delay distortion for the largest number of subscribers having the same number of bi-directional amplifiers 10 in their respective transmission paths. Also, similar to the first preferred embodiment, factors, for example, relating to signal quality and/or available capacity may prevent CMTS 20 from assigning a frequency in the upper portion or the middle and lower portion of the upstream bandwidth. Furthermore, for an upstream bandwidth having a range other than approximately 5–42 MHz, a CM 8 with an upstream transmission having a delay distortion equal to the predetermined threshold may be assigned to frequencies near the split between the upstream and downstream bandwidths.

In a third preferred embodiment of the present invention, rather than equalizer 55 being a fixed equalizer, equalizer 55 is a variable, but non-adaptive, equalizer that is set for each respective upstream transmission. CMTS 20 determines the delay distortion of an upstream transmission from a CM 8 using information corresponding to CM 8 from database 40. Then CMTS 20 sends signals to adjust the tap weights of the equalizer 55 in a well known manner. Furthermore, variable equalizer 55 may comprise any conventional equalizer with programmable tap weights.

Figure 5:
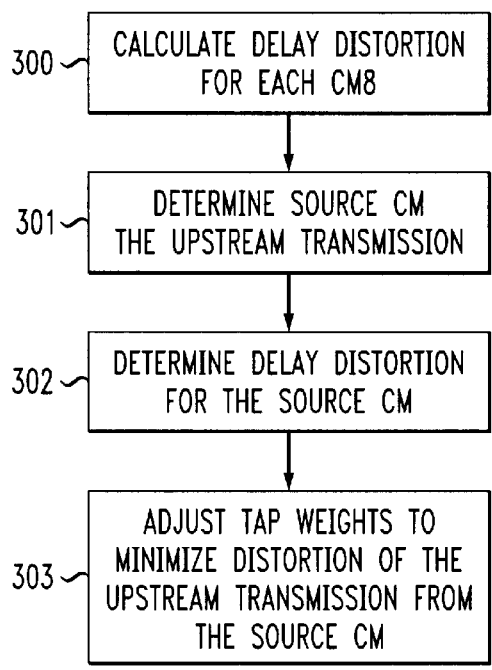
FIG. 5 is a flow diagram of a third preferred embodiment for reducing delay distortion.
Figure 6:
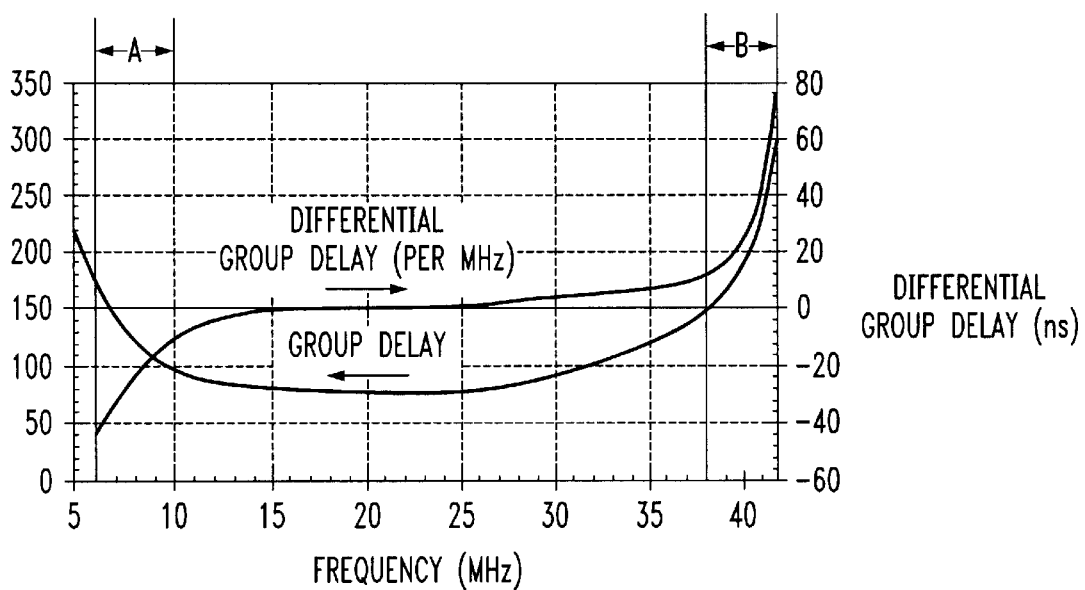
FIG. 6 is a chart illustrating group delay caused by a bi-directional amplifier having two-diplexing filters.

FIG. 5 is a flow diagram of the third preferred embodiment of the present invention using the variable equalizer 55 located at fiber node 15. In step 300, CMTS 20 calculates the delay distortion for each CM 8 connected to CMTS 20. For calculating delay distortion, CMTS 20 may query database 40 for the bi-directional amplifier type, number of bi-directional amplifiers of that type, CM type and fiber node type for each CM 8. If there is more than one bi-directional amplifier type in a transmission path for a CM 8, then the bi-directional amplifier type and number of bi-directional amplifiers of each type are retrieved. CMTS 20 stores the calculated distortion for each CM 8 connected thereto in memory which can be quickly accessed to retrieve the calculated delay distortion for the identified source.

In step 301, CMTS 20 determines which CM 8 is the source of an upstream transmission. In step 302, CMTS 20 determines the delay distortion for the CM 8 that is the source of the upstream transmission. For example, CMTS 20 identifies the ID of the source CM 8 and retrieves the stored, calculated, delay distortion associated with the source CM 8.

In step 303, the tap weights of the variable equalizer are adjusted to minimize delay distortion of the upstream transmission just prior to receiving the upstream transmission from the source CM 8. This preferred embodiment requires only a single equalizer at the fiber node 15 for minimizing delay distortion of an upstream transmission received at fiber node 15 from a CM 8, and thus, provides an inexpensive alternative to minimizing delay distortion by providing a pre-emphasis filter at each transmitter.

CMTS 20 provides cycles for transmitting data upstream. For example, during one cycle, CMs 8 that have been assigned a time slot for an upstream transmissions are allowed to transmit. Thus, CMTS 20 can determine when an upstream transmission from a particular source CM 8 will be received at fiber node 15, and CMTS 20 can adjust the tap weights of variable equalizer 55 just prior to receiving the upstream transmission. For a contention-based cycle, however, the head end 20 may not be able to determine which particular CM is the source of the upstream transmission. In this situation, one of ordinary skill in the art would readily recognize that the tap weights for equalizer 55 can be set to minimize delay distortion for a predetermined value for a variety of reasons. For example, equalizer 55 at fiber node 15 can be set to minimize the maximum delay distortion or minimize the average delay distortion. Also, equalizer 55 at fiber node 15 can be set to minimize delay distortion for the largest number of subscribers, i.e., the largest number of subscribers that have transmission paths with similar delay distortion.

Each of the preferred embodiments shown in FIGS. 3 and 4 include a step for calculating the delay distortion of the upstream transmission from a CM 8 using the information stored in database 40 corresponding to CM 8, e.g., bi-directional amplifier type, number of bi-directional amplifiers of that type, CM type and fiber node type. Once the delay distortion is calculated for a CM 8, however, it may be stored in the database 40. Thus, the CMTS 20 may simply query database 40 for the delay distortion for a CM 8. Also, the preferred embodiment shown in FIG. 3 includes a step for determining whether delay distortion for a CM 8 is less than a predetermined threshold. One of ordinary skill in the art could readily set the threshold, so the delay distortion must be equal to the predetermined threshold to assign the upper portion of the upstream bandwidth to the CM 8. Also, the threshold may, for example, include a range of delay distortion values.

In addition to utilizing database 40 for calculating delay distortion, database 40 may be used for other purposes, such as for repair purposes. For example, if a bi-directional amplifier 10 needs to be replaced, database 40 can be queried for determining the type of bi-directional amplifier that needs replacing. Also, information stored in database 40, may for example, be edited or input by an operator.

Furthermore, in addition to minimizing delay distortion, amplitude distortion may be minimized with the equalizers used in the present invention. Also, fixed equalizer 55 utilized in the first and second preferred embodiments of the present invention may include a fixed equalizer or a variable equalizer in which the tap weights are adjusted, for example, to minimize delay distortion for a particular transmission path and then left alone.

What has been described are the preferred embodiments of the present invention. It, however, will be apparent to those skilled in the art that it is possible to embody the invention in specific forms other than those disclosed in the preferred embodiments described above. This may be done

What is claimed is:

1. A method of assigning upstream bandwidth to a downstream cable modem communicating with a cable modem termination system in a cable television distribution plant, the method comprising steps of:
   obtaining identity of said cable modem
   determining characteristics of said cable television distribution plant between said identified cable modem and said cable modem termination system by means of a database lookup; and
   assigning a frequency for the upstream transmission based said characteristics.

2. The method of claim 1, where said characteristics relate to delay distortion between said cable modem and said cable modem termination system.

3. A method of assigning upstream bandwidth in a cable television distribution plant, comprising steps of:
   calculating delay distortion of an upstream transmission caused by diplexing filters in a transmission path for the upstream transmission;
   assigning a frequency for the upstream transmission based upon the calculated delay distortion for the transmission path; and
   comparing the calculated delay distortion to a predetermined threshold;
   wherein the step of assigning upstream bandwidth further includes a step of assigning bandwidth in the upper portion of the upstream bandwidth, when the calculated delay distortion is less than the predetermined threshold.

4. The method of claim 3, wherein the upper portion of the upstream bandwidth is approximately 38–42 MHz.

5. The method of claim 3, further comprising a step of setting the predetermined threshold so the calculated distortion of an upstream transmission having a relatively minimal number of a bi-directional amplifiers in its transmission path is less than the predetermined threshold.

6. The method of claim 5, further including a step of minimizing delay distortion for the upstream transmission using a fixed equalizer.

7. The method of claim 6, wherein the fixed equalizer is configured to minimize delay distortion for an upstream transmission path having a relatively minimal number of a bi-directional amplifiers.

8. The method of claim 6, wherein the fixed equalizer is configured to minimize delay distortion for a relatively large number of subscribers having the same number of bi-directional amplifiers in their respective transmission paths.

9. The method of claim 5, wherein the relatively minimal number of bi-directional amplifiers is one.

10. The method of claim 2, wherein the step of assigning a frequency firer includes assigning a frequency in the upstream bandwidth near a split between the upstream and downstream bandwidths, when the delay distortion is less than the predetermined threshold.

11. The method of claim 2, wherein the step of assigning upstream bandwidth further includes a step of assigning bandwidth in the upper portion of the upstream bandwidth, when the delay distortion is approximately equal to the predetermined threshold.

12. The method of claim 11, further comprising steps of:
   identifying a largest number of subscribers having the same number of bi-directional amplifiers in their respective transmission paths; and
   setting the predetermined threshold approximately equal to the delay distortion of a transmission path having the same number of bi-directional amplifiers as each the largest number of subscribers.

13. The method of claim 11, wherein the threshold is a range of delay distortion values and the upstream transmission is assigned to the upper portion of the upstream bandwidth when the delay distortion of the upstream transmission is within the range.

14. The method of claim 12, further including a step of minimizing delay distortion using a fixed equalizer.

15. The method of claim 14, wherein the fixed equalizer is configured to minimize delay distortion for the largest number of subscribers having the same number of bi-directional amplifiers in their respective transmission paths.

16. A method of assigning upstream bandwidth in a cable television distribution plant, comprising steps of:
   calculating delay distortion of an upstream transmission caused by diplexing filters in a transmission path for the upstream transmission;
   assigning a frequency for the upstream transmission based upon the calculated delay distortion for the transmission path;
   identifying a source of the upstream transmission; and
   retrieving information from a database that corresponds to the source
   wherein the information includes at least one of a cable modem type, a bi-directional amplifier type, number of bi-directional amplifiers of each type and fiber node type.

17. The method of claim 16, wherein the step of calculating the delay distortion filter includes summing delay distortion caused by the retrieved cable modem type, number of bi-directional amplifiers of each type and the fiber node type.

18. A method of assigning upstream bandwidth in a cable television distribution plant, comprising steps of:
   calculating delay distortion of an upstream transmission caused by diplexing filters in a transmission path for the upstream transmission;
   assigning a frequency for the upstream transmission based upon the calculated delay distortion for the transmission path;
   identifying a source of the upstream transmission; and
   retrieving information from a database that corresponds to the source
   wherein the retrieved information includes a number of diplexing filters and the number of diplexing filters of each type associated with the source.

19. The method of claim 18, wherein the step of calculating the delay distortion further includes summing delay distortion caused by the retrieved number of diplexing filters for each type.

20. The method of claim 1, wherein the distribution plant is a hybrid fiber-coaxial distribution plant.

21. A hybrid-fiber coaxial distribution plant, comprising:
   a fiber node;
   multiple cable modems connected to the fiber node,
   a transmission path between each cable modem and the fiber node; and a cable modem termination system connected to the fiber node, the cable modem termination system assigning an upstream transmission frequency for each cable modem based on a database lookup that contains information for each of said multiple cable modem, which information is reflective of delay distortion for each upstream transmission path associated with each cable modem.

22. The hybrid-fiber coaxial distribution plant of claim 21 further comprising a database, wherein the database stores information corresponding to each cable modem.

23. A hybrid-fiber coaxial distribution plant, comprising:

a fiber node;

multiple cable modems connected to the fiber node;

a transmission path between each cable modem and the fiber node, a cable modem termination system connected to the fiber node, the cable modem termination system assigning an upstream transmission frequency for each cable modem based on calculated delay distortion for each upstream transmission path associated with each cable modem; and a database that stores information corresponding to each cable modem;

wherein the calculated delay distortion is calculated from information stored in the database corresponding to each cable modem.

24. The hybrid-fiber coaxial distribution plant of claim 23 wherein the information comprises cable modem type, a bi-directional amplifier type, number of bi-directional amplifiers of that type and fiber node type.

25. The hybrid-fiber coaxial distribution plant of claim 23 wherein the information comprises the type of diplexing filters and the number of diplexing filters for each type in the transmission path.

26. A hybrid-fiber coaxial distribution plant, comprising:

a fiber node;

multiple cable modems connected to the fiber node;

a transmission path between each cable modem and the fiber node; and a cable modem termination system connected to the fiber node, the cable modem termination system assigning an upstream transmission frequency for each cable modem based on calculated delay distortion for each upstream transmission path associated with each cable modem; and wherein the assigned frequency is in the upper portion of the upstream bandwidth or near the split between the upstream and downstream bandwidths, when the calculated delay distortion is less a predetermined threshold.

27. A hybrid-fiber coaxial distribution plant, comprising:

a fiber node;

multiple cable modems connected to the fiber node;

a transmission path between each cable modem and the fiber node, and a cable modem termination system connected to the fiber node, the cable modem termination system assigning an upstream transmission frequency for each cable modem based on calculated delay distortion for each upstream transmission path associated with each cable modem; and wherein the assigned frequency is in the upper portion of the upstream bandwidth or near the split between the upstream and downstream bandwidths, when the calculated delay distortion is approximately equal to a predetermined threshold.

28. The hybrid-fiber coaxial distribution plant of claim 21 further comprising a fixed equalizer at the fiber node for minimizing delay distortion.

29. A cable television distribution plant comprising:

multiple cable modems;

a database storing information relating to each cable modem, which information is reflective of transmission distortion suffered by said each cable modem when transmitting upstream; and a cable modem termination system assigning an upstream transmission frequency for each cable modem based upon information stored in the database for each cable modem.

30. The method of claim 2 further comprising a step of comparing the calculated delay distortion to a predetermined threshold.

* * * * *